Nov. 22, 1955  J. R. OISHEI  2,724,139
DETERGENT APPLYING WIPER
Filed Oct. 22, 1949
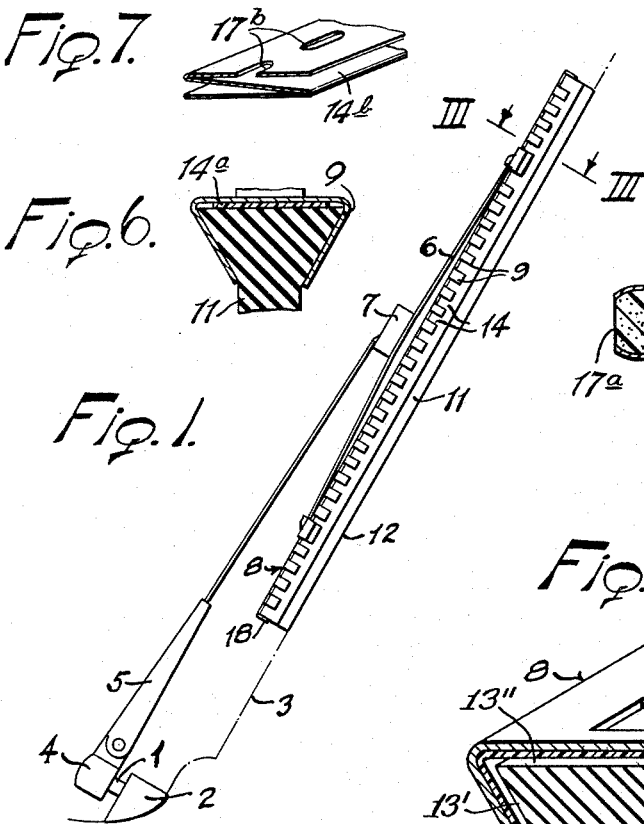
INVENTOR
John R. Oishei
BY
Bean, Brooks, Buckley + Bean
ATTORNEYS

United States Patent Office 2,724,139
Patented Nov. 22, 1955

2,724,139

DETERGENT APPLYING WIPER

John R. Oishei, Buffalo, N. Y., assignor to Trico Products Corporation, Buffalo, N. Y.

Application October 22, 1949, Serial No. 122,878

6 Claims. (Cl. 15—250.3)

This invention relates to the windshield cleaning art and more particularly to a wiper which is moved back and forth upon the windshield surface, either curved or flat, for maintaining a clear field of vision therethrough.

The road dust and oil film which collects upon the windshield is difficult to remove by the windshield wiper and causes the latter to spread the first raindrops across the glass in a vision-obscuring film much to the annoyance of the motorist. To facilitate the cleaning action it has heretofore been proposed to incorporate a wetting agent in the form of a detergent in the rubber of the wiper for dissolving out onto the windshield surface in expediting the removal of the road or oily film therefrom. This, however, requires the discard of the rubber or squeegee element after the detergent content becomes exhausted, thus shortening the life of the element relative to the present day wiper. Again, the incorporation of the detergent as an ingredient in the rubber may present a problem in the manufacture, and a condition in the use such as to render the rubber element impractical and the wiper inefficient.

The object of the present invention is to provide a wiper by which the wetting agent may be effectively applied in a practical manner while maintaining the original efficiency of the wiper without impairment of its rubber.

A further object of the invention is to provide a detergent-applying wiper having a renewable cartridge or carrier to facilitate the replenishment of the detergent as the occasion may demand for prolonging the intended usefulness of the wiper.

The foregoing and other objects will manifest themselves as the following description progresses, reference being made therein to the accompanying drawing, wherein Fig. 1 is a side elevation of a windshield wiper embodying the present invention;

Fig. 2 is a detail perspective view showing a section of the wiper unit;

Fig. 3 is a transverse section taken about on line 3—3 of Fig. 1, illustrating the wiper unit in operation;

Fig. 4 is an enlarged detail sectional view in fragment of a modified carrier for the wetting agent;

Figs. 5 and 6 are further modified showings of the invention; and

Fig. 7 is a fragmentary perspective view of another carrier.

Referring more particularly to the accompanying drawing, the numeral 1 designates the wiper actuating shaft which is journaled in a bearing 2 at the lower side of the windshield 3 and carries at its outer end an articulated wiper arm 4 having a spring-urged outer section 5 detachably connected to the pressure distributing member 6 of the wiper by a clip or coupler 7 thereon. The wiper is blade-like in form and as depicted may comprise a channeled holder 8, having inwardly converging side walls each composed of a series of fingers 9, for imparting flexibility to the connecting back wall 10, and an elastic squeegee element 11 of rubber or the like. This squeegee body has a wiping edge 12 along one margin and an anchoring bead 13 along the opposite margin. In the illustrated embodiments, the anchoring bead is enlarged and provided with outwardly flaring sides 13' joined by a back face 13", the bead being loosely embraced by the inwardly converging channel side wall fingers 9 and the back wall 10 to free the squeegee body of any binding stresses which might otherwise preclude uniform contact of the readily flexible and surface-conforming wiping edge 12 with the glass. When the wiper is moved back and forth on the windshield the rubber or squeegee element will rock on its wiping edge to the extent permitted by the channel walls.

In accordance with the present invention, means are provided for supplying the wiping edge with a wetting agent or detergent. This depository or supply preferably is made renewable to enable replenishment from the time to time. According to the illustrated embodiment the carrier may be in the form of a flexible strip 14 to readily conform itself to the shape of the holder. This carrier strip is inserted in the channel between the back wall 10 and the back face 13" and may be either fixed therein, as in Fig. 2, or loose, as shown at 14a in Fig. 5. The detergent-carrying strip will therefore serve as a backing for the squeegee body and a liner for the channeled holder upon which liner the rubber body will play and rock within the channel of the holder. If desired, the opposite margins of the strip may be turned up to impart a channel formation to receive the squeegee body either snugly or loosely, and these side walls 16 of the channeled detergent strip may project beyond the confining side walls or fingers 9 and adjacent the web 15 of the squeegee to effect a deposit of the agent onto the body for flow down to the wiping edge 12.

When the carrier becomes wet with rain a part of its wetting agent will dissolve and flow down the sides of the squeegee toward the wiping edge for deposit upon the windshield surface in advance of the wiping edge. This deposit is accelerated by the squeegee element rocking against the detergent carrier within the holder channel, sufficient clearance being provided to enable the squeegee element rocking and alternately contacting spaced portions of the liner strip, in Figs. 3 and 5, as well as the opposite sides of the channeled liner, with more of a massaging or kneading action.

The volume of detergent applied may be regulated to avoid undue waste. To this end means are provided to restrict the access of the rain to the soluble content of the carrier such as by forming the holder with water admitting openings 17 predetermined in size for the particular wetting agent. Additional surface exposure will be provided through the spaces 9' between fingers 9. By reason of the limited access thus provided, the needed moisture for dissolving the wetting agent is regulated to retard the rate of flow to the wiping edge. As a modification, the liner or carrier 14a, formed of a suitable plastic, may be sealed with a protective lacquer coating 19 which is interrupted, as at 17a, to give the moisture limited access to the detergent ebodied plastic body. Or the protective coating may be punctured at intervals, as at 17b in Fig. 7, to expose the wetting agent to the solvent. The life of the detergent carrier unit is prolonged by the flow regulation thus provided.

The detergent exposing apertures 17b may be formed by a punching operation, while the exposure 17a may be effected in a practical manner by severing the strip 14a from sheet stock previously coated on its opposite faces with the sealing lacquer. The shearing knife will also tend to bring the edges of the coatings toward each other to more or less contract the intervening gap. By regulating the spacing of the sheared edges the access to the wetting agent may be readily controlled. As a still further aid to retard the rate of use, the dissolved agent may be caused to flow in a circuitous path to the wiping edge by folding the carrier body 14b, Fig. 7, so that the detergent flow from the points of exposure 17b will follow the folded walls, as through capillary action, and be squeezed out on alternate strokes as the squeegee body rocks on the carrier. As the supply of the wetting agent becomes exhausted, the carrier or liner may be replaced by withdrawing it lengthwise from the channel, after first turning up a downturned retaining tongue 18 on the holder, and inserting a new liner.

By reason of the controlled access meted out to the protected wetting agent the carrier 14a may be permanently clamped in the channeled holder together with the squeezee body 11, as shown in Fig. 6 wherein the wiping blade is rigid or inflexible and therefore is especially adapted for the wiping of flat surfaces only, in contrast to the other embodiments herein illustrated which are surface-conforming in character and consequentially will clean both flat and curved windshields.

With the present invention the constituency of the rubber wiping body 11 remains unaffected, the detergent being supplied from an extraneous self-feeding depositiory. The liner may be either flexible or inflexible and composed of plastic, rubber, powdered metal, or other suitable material capable of functioning in the intended manner. The wetting agent may be one suitable for the purpose, such as aerosol O. T. when incorporated in a rubber strip, or nacconol when combined with a vinylite resin plastic. The manner of incorporating the agent will depend upon the body of the carrier whether it be chemically combined or mechanically.

The foregoing description has been given in detail for clarity and not by way of limitation since the inventive principles involved are capable of assuming other physical embodiments without departing from the spirit of the invention and the scope of the appended claims.

What is claimed is:

1. A windshield wiper comprising a channeled holder, a squeegee having a longitudinal margin loosely confined within said holder for lateral rocking therein, and a detergent holding element interposed between the side walls of said holder and said squeegee margin whereby to effect an intermittent squeezing of said element by the lateral rocking of said squeegee.

2. A windshield wiper comprising a squeegee element having a wiping edge, and a backing therefor extending along the opposite edge of said element and exposed to the weather, said backing containing a wetting agent dissoluble in the presence of moisture for flow down over said squeegee element and onto the surface being acted upon by said wiping edge, said squeegee element being rockable back and forth upon said backing to express the wetting agent therefrom.

3. A wiper having an elongate flexible body with a wiping edge along one margin and an anchoring enlargement along the opposite margin and an intervening web, a channeled holder loosely embracing the anchoring enlargement for laterally rocking therein, and a wetting agent carrier within the holder channel upon which the anchoring enlargement rocks to squeeze the carrier intermittently, the back of the holder having openings exposing the carrier to the weather, the wetting agent being dissoluble when wet for flow from the carrier onto the body.

4. A wiper having arm attaching means and comprising a holder, a squeegee element rockable on a surface of said holder, and a detergent carrier interposed between said surface and said element and engageable by said element by and during its rocking action on said surface to squeeze the carrier intermittently for assisting in feeding the detergent content of said carrier onto the squeegee element, the detergent being dissoluble when wet.

5. A wiper comprising a squeegee element, a channeled holder therefor, a dissoluble wetting agent impregnated strip arranged in the holder channel between said squeegee element and the bottom of the holder channel, and a protective coating for said strip exposing the side edges thereof for controlling feeding of dissolved agent to said squeegee element.

6. A wiper comprising a squeegee element, a channeled holder therefor, a dissoluble wetting agent impregnated strip arranged in the holder channel between said squeegee element and the bottom of the holder channel, and a protective coating for said strip exposing portions thereof for access to moisture and defining a circuitous path of flow for dissolved wetting agent.

References Cited in the file of this patent

UNITED STATES PATENTS

| | | |
|---|---|---|
| 1,386,362 | Pittman | Aug. 2, 1921 |
| 1,681,395 | Christen | Aug. 21, 1928 |
| 1,828,715 | Oishei | Oct. 20, 1931 |
| 1,888,326 | Mullen | Nov. 22, 1932 |
| 1,915,775 | Christen | June 27, 1933 |
| 1,935,881 | Knox | Nov. 21, 1933 |
| 2,098,482 | Bashford | Nov. 9, 1937 |
| 2,179,451 | Horton | Nov. 7, 1939 |
| 2,354,440 | Brown | July 25, 1944 |